United States Patent [19]

Hay

[11] Patent Number: 5,013,572
[45] Date of Patent: May 7, 1991

[54] STEAM STRIPPING OF ODOR FORMING IMPURITIES FROM HOP FLAVORS

[75] Inventor: Bruce A. Hay, Groton, Conn.

[73] Assignee: Pfizer Inc., New York, N.Y.

[21] Appl. No.: 473,089

[22] Filed: Jan. 31, 1990

[51] Int. Cl.⁵ ............................................. C12C 3/00
[52] U.S. Cl. ...................................... 426/600; 426/476
[58] Field of Search ................. 426/600, 474, 475, 476

[56] References Cited

U.S. PATENT DOCUMENTS

| | | | |
|---|---|---|---|
| 3,798,332 | 3/1974 | Westerman et al. | 426/98 |
| 3,875,316 | 4/1975 | Humphrey | 426/329 |
| 4,002,683 | 1/1977 | Todd, Jr. | 568/361 |
| 4,302,479 | 11/1981 | Humphrey et al. | 426/600 |
| 4,395,431 | 7/1983 | Lance et al. | 426/600 |
| 4,778,691 | 10/1988 | Todd, Jr. et al. | 426/600 |

FOREIGN PATENT DOCUMENTS 245899  5/1987  Fed. Rep. of Germany ...... 426/600

*Primary Examiner*—Carolyn Paden
*Attorney, Agent, or Firm*—Peter C. Richardson; J. Trevor Lumb; A. Dean Olson

[57] ABSTRACT

A method of removing objectionable impurities from a hop flavor so that the impurities will not cause a fruity aroma of the beer. The method comprises steam stripping the odor forming impurities from the hop flavor at a pH such that the steam stripping is effective in removing the impurities to produce the purified hop flavor.

11 Claims, No Drawings

STEAM STRIPPING OF ODOR FORMING IMPURITIES FROM HOP FLAVORS

CROSS-REFERENCE TO RELATED APPLICATION

Attention is directed to commonly assigned copending application, U.S. Ser. No. 473,268 filed Jan. 31, 1990 entitled "Methods for Making Tetrahydroisoalpha and Hexahydroisoalpha Acids" filed on even date herewith, which discloses hop flavor making processes, the disclosure of which is hereby incorporated by reference.

TECHNICAL FIELD

The field of art to which this invention is directed is the removal of undesirable odor-forming impurities from hop flavors, particularly alpha and isoalpha acids and reduced isoalpha acids.

BACKGROUND ART

Hops have been used for centuries to flavor beer and are considered, along with water, yeast, and malt, to be an essential ingredient. Since the sixties, following elucidation of the structure of the hop bittering compounds in the fifties by such pioneering investigators as Rigby and Verzele, various forms of chemically modified hop extracts have found their way into commercial application.

A goal of present brewing technology is to make reproducible brews. Difficulties are encountered at every stop in the brewing process: unwanted variations in yeast cultures, in hops, in malt, in adjuncts, and even in times, temperatures, and the human element of the brewhouse. Beer presents a subtle combination of carbonation, foam, mouth feel, bitterness, and aroma when smelled and swallowed. Whatever can be done to improve the reproducibility and control of even one variable—yeast, hops, malt, adjuncts—is exceptionally important.

Hop flavors have attracted widespread interest in recent years for use in controlling and standardizing the flavoring of beer including ale, especially by post-fermentation treatment.

U.S. Pat. No. 4,778,691 teaches that unidentified hop-derived substances, when present during fermentation, are either metabolized or removed by the yeast. However, when they are added post-fermentation, they complex or esterify with the alcohol present to give the undesirable fruity-estery-fatty or stout type of aromas during normal storage of the beer. Therefore, such a flavored fresh beer may be acceptable, but one aged for several weeks may not.

U.S. Pat. No. 4,778,691 also states that the prior art is not effective in removing the undesirable impurities. For example, Todd (U.S. Pat. No. 4,002,683) removes humulinic acid, tannins, sugars, and gushing promoters. Humphrey (U.S. Pat. No. 4,302,479) performs a highly-acidic wash of an organic solvent solution of extract. Neither procedure, because of the very acidic pH used for purification, will remove neutral materials. Lance (U.S. Pat. No. 4,395,431) elutes these substances with the alpha acids, and does not remove or separate them. Westermann (U.S. Pat. No. 3,798,332), concentrates them with his so-called pure isoalpha acids. The procedure of Humphrey (U.S. Pat. No. 3,875,316) also does not remove them.

In contrast, U.S. Pat. No. 4,778,691 teaches the extraction of impurities by agitating the hop flavor with water at a pH of 4 to 12 and extracting the impurities from the organic phase into the aqueous phase.

Although there has been some research into the removal of undesirable odors and odor-forming compounds from hop flavors, there is a continuing search for more efficient, effective methods.

SUMMARY OF THE INVENTION

The present invention describes a method of removing objectionable impurities from a hop flavor. The method comprises steam stripping the odor forming impurities from the hop flavor at a pH such that the steam stripping is effective in removing the impurities to produce the purified hop flavor.

Other features and advantages will be apparent from the specification and claims.

DETAILED DESCRIPTION OF THE INVENTION

The method of this invention may be applied to any hop flavors. Hop flavors are those flavoring agents that are typically derived from hops. Hop flavors are produced, for example, from hops by liquid $CO_2$ extraction followed by an aqueous extraction at a pH of about 8 to about 8.3. Exemplary hop flavor agents include alpha acids (humulones), isoalpha acids (isohumulones), dihydroisoalpha acids, tetrahydroisoalpha acids (hereinafter referred to as THIAA), hexahydroisoalpha acids (hereinafter referred to as HHIAA) and combinations thereof. When derived from hops (in contrast to synthetically derived compounds) these hop flavors typically exist as mixtures of homologs, stereoisomers and optical isomers. For example, alpha acids typically exist as a combination of three homologs in which the acyl group is isobutyryl, isovaleryl, or 2-methylbutyryl. In addition the process of this invention may be applied to combinations of the above described hop flavors.

The process of this invention is particularly applicable to treatment of THIAA and HHIAA. As described below it is desirable that THIAA is steam stripped as a salt. Any salt of THIAA that does not deleteriously affect the steam stripping process (e.g., the stability of the THIAA) may be used. Generally alkali metal and alkaline earth salts are used. Exemplary counterions include potassium, sodium, magnesium, and calcium.

This process removes a variety of undesired impurities from the hop flavors. In particular the process is well suited for removing odor- or aroma-forming impurities or contaminants. Although not fully understood these impurities impart fruity, estery, fatty, or sour type aromas, to the hop flavors. It is believed these impurities are typically present at levels of about 0.1 ppm to about 100 ppm. It is believed some of these impurities are a result of using alcohols (e.g., ethanol) in the production of the hop flavors. This process results in purified hop flavors. By purified is meant essentially void of the odor forming impurities described above. This may be tested for by the organoleptic test described below.

The test sample is dissolved in 95% alcohol to obtain a concentration of 1–2% of the hop flavor. The exact concentration of the hop flavor in the alcohol solution is determined by HPLC. A 6½ oz. bottle of sparkling mineral water is uncapped and a quantity of alcohol solution calculated to give an overall concentration of 5 ppm of hop flavor is added. The bottle is recapped and inverted 2 or 3 times to mix it. The bottle is stored in a refrigerator for at least 18 hours prior to tasting. The samples are divided into sets of four. Each set includes a control prepared from analytically pure hop flavor. The samples are assigned arbitrary code numbers. A 1-2 oz. portion of each sample of a set is poured into a clean glass marked with the code number and distributed to a panel of four tasters. Members of a panel are instructed to record their separate impressions of the aroma and flavor of each sample. Results are considered significant if three of the four panel members agree that there is or is not odor. If results are ambiguous, the evaluation is repeated with solutions containing 10 ppm of hop flavor.

The method of this invention comprises steam stripping impurities from hop flavors to produce purified hop flavor. Typically the process comprises the continual addition of water to the starting material and distillation of water and impurities from the starting material to achieve the desired purification. Although the invention is described as steam stripping, it is envisioned that alternative azeotropic solvent systems may be utilized, where effective.

The pH of the hop flavor starting solution is critical to the process because the form of the hop flavor as the salt or the acid is important. Thus, a pH should be used such that steam stripping is effective in removing the above-described impurities to produce the purified hop flavor.

For THIAA the pH is preferably such that THIAA exists as a salt. It is especially preferred for THIAA that the pH is such that the THIAA is soluble in a protic solvent, particularly water. It has been found that the steam stripping is not as effective under other conditions (i.e., at other pH's). It is especially preferred for steam stripping the impurities from THIAA that the pH be from about 8 to about 11. Below about pH 8 oil precipitation and decomposition can occur. Above about pH 11 undesired base-catalyzed side chain cleavage of the THIAA can occur.

Preferably, for HHIAA the pH is such that HHIAA is present in the free acid form. In addition or alternatively for HHIAA the pH is preferably such that HHIAA is insoluble in a protic solvent (i.e., not soluble in water). It has been found that steam stripping of HHIAA is not as effective under other conditions (i.e., at other pH's). It is especially preferred that for steam stripping of HHIAA the pH be about 1 to about 4, as above about pH 4 the HHIAA is typically undesirably at least partially soluble in the aqueous phase.

The removal of the odor forming compounds preferably occurs in the absence of an oxygen containing gas since the hop flavors are subject to oxidation when heated, particularly under basic conditions. Thus typically the steam stripping is performed under an inert gas such as nitrogen.

The steam stripping is typically performed at reflux conditions which may vary depending on whether the process is performed under vacuum (i.e., typically a partial vacuum). Exemplary pressures range from 50 millimeters of mercury to atmospheric pressure.

Generally, sufficient water is added to the impure hop flavor during the steam stripping to ensure that the remaining hop flavor is purified Again, by purified is meant essentially void of the odor forming impurities described earlier.

Preferably, the hop flavor is present at a concentration of about 10% to about 50% prior to steam stripping because it is more efficient to have the concentration of hop flavor high while maintaining its solubility. Typically a volume of water greater than the volume of hop oil is used. Preferably water is added at about the same rate that it is distilled off.

Once the odor forming impurities are removed the hop flavor can be isolated by a variety of techniques such as acid precipitation. For example, the HHIAA solution can be cooled and the HHIAA oil allowed to separate from the aqueous layer. In contrast, THIAA (in the salt form) is typically acidified to a pH of about 3 or below to separate the THIAA oil from the aqueous layer.

EXAMPLE 1

THIAA was produced and then steam stripped according to the following procedure.

100 grams of aqueous alpha acid solution at pH 8 containing 14.4% alpha acids by HPLC analysis was acidified to a pH below 2.0 with 50% sulfuric acid. The oil was separated, 75 milliliters of water was added, and 20% aqueous potassium hydroxide solution was slowly added under nitrogen with stirring and gentle heating to adjust the pH to 10.5. Care was taken to insure that the pH did not go above 10.5. After all of the material had dissolved and the pH had stabilized, 1 gram of potassium carbonate and 1 gram of magnesium chloride hexahydrate were added. After stirring, the pH was readjusted to 10.5 with 20% potassium hydroxide. 2 grams of 10% palladium on carbon was added, and the mixture was hydrogenated on a Parr shaker at 50 psig and 100° C. for 6 hours. The reaction mixture was cooled, 100 milliliters of ethanol was added, and the catalyst was removed by filtration. The ethanol was removed by rotary evaporation, the solution was acidified to a pH below 2.0 with 50% sulfuric acid, and the oil was separated. 100 milliliters of water was added to the oil, the mixture was shaken, and the oil separated to yield 19.8 grams of material. This material was assayed at 65% THIAA by HPLC for an 89% yield from alpha acids.

A 10 gram sample of THIAA oil with a noticeable ethyl ester odor was added to 50 grams of water. The mixture was heated to 100° C. under a nitrogen atmosphere with stirring, and the pH was slowly brought to 10.5 with 20% aqueous potassium hydroxide solution. After all of the oil was in solution and the pH had stabilized, the heat was increased to reflux conditions and water was distilled from the mixture.

Fresh water was added through an addition funnel to keep the volume of the solution constant as the distillation proceeded. Once the temperature of the distillate reached 100° C. a further 50 grams of water was distilled off. The mixture was then cooled, and acidified to a pH below 2.0 with 50% sulfuric acid. The oil was separated, 50 milliliters of water was added, the mixture was shaken, and the oil was separated once again. The product was 10.0 grams of THIAA oil with no noticeable ethyl ester type odors.

Alternatively, in the above synthesis of THIAA, after removal of ethanol by rotary evaporation, the heat was increased to reflux conditions and steam distillation started at that point.

EXAMPLE 2

HHIAA was produced and then steam stripped according to the following procedure.

50 milliliters of methanol, 1 gram of potassium carbonate, and 1 gram of magnesium chloride hexahydrate in 20 milliliters of water was added to 100 grams of an aqueous solution containing 16.4% alpha acids. The mixture was adjusted to pH 10.5 with 20% aqueous potassium hydroxide solution, then 9.7 grams of 12.0% sodium borohydride in 14M sodium hydroxide was added. 2 grams of 10% palladium on carbon was added, and the mixture was placed on the Parr shaker and hydrogenated at 10 psig and 100° C. As the pressure in the flask increased, it was vented to insure that the pressure stayed below 50 psig. After 3 hours, 2 grams more of 10% palladium on carbon was added and the hydrogenation was continued at 50 psig and 100° C. for 3 hours. The mixture was cooled, 100 milliliters of methanol was added, and the catalyst was removed by filtration. The methanol was removed by rotary evaporation, the mixture was acidified to a pH below 2.0 with 50% sulfuric acid, and the oil was separated to yield 23.6 grams of material. HPLC indicated that HHIAA was a primary product.

The material was then steam stripped according to the following procedure.

A 10 gram sample of HHIAA oil with a noticeable ethyl ester odor was added to 50 grams of water yielding a pH of about 3. The mixture was heated to 100° C. under a nitrogen atmosphere with stirring, and water was distilled from the mixture. Fresh water was added through an addition funnel to keep the volume of the solution constant as the distillation proceeded. Once the temperature of the distillate reached 100° C. a further 50 grams of water was distilled off. The mixture was then cooled, and the oil was separated. 50 milliliters of water was added, the mixture was shaken, and the oil separated once again. The product was 10 grams of HHIAA oil with no noticeable ethyl ester type odors.

The following Table outlines odor response for several samples of THIAA and HHIAA steam stripped according to the above examples. All samples of oil had odor prior to treatment and were tested using the organoleptic test described earlier. Each entry constitutes a different oil sample.

TABLE

Organoleptic Results for Steam-Stripped Hop Oils

| Material | pH of Strip | Odor after Strip |
|---|---|---|
| THIAA Oil | 10.5 | None |
| THIAA Aqueous Solution* | 10.0 | None |
| THIAA Oil | 9.0 | None |
| THIAA Oil | 3.0 | Yes |
| THIAA Oil | 3.0 | Yes |
| HHIAA Oil | 10.5 | Yes |
| HHIAA Oil | 10.0 | Yes |
| HHIIA Oil | 3.0 | None |
| HHIIA Oil | 3.0 | None |

*not isolated prior to strip according to the alternative procedure for THIAA as detailed in Example 1

This process makes a significant contribution to the beer brewing industry by providing a simple effective method of removing undesirable odors from hop flavors. The process is more efficient than purification processes that use acid oil precipitations because with those processes some hop flavor is removed with the odor causing impurities. This process is especially adaptable to use in conjunction with those processes described in commonly assigned copending application, U.S. Ser. No. 473,268 filed Jan. 31, 1990 entitled "Methods for Making Tetrahydroisoalpha and Hexahydroisoalpha Acids", particularly those used to make THIAA and HHIAA.

Finally this process is easily integratable with a hop flavor (e.g., THIAA) production process that ends at the desired pH for the steam stripping. This includes most known routes to THIAA. For example, THIAA may be produced in an aqueous solution at a pH of about 10. In that case there is no need to isolate the THIAA oil prior to steam stripping.

It should be understood that the invention is not limited to the particular embodiments shown and described herein, but that various changes and modifications may be made without departing from the spirit and scope of this novel concept as defined by the following claims.

What is claimed is:

1. A method for the removal of undesirable odor-forming impurities from a hop flavor selected from the group consisting of tetrahydroisoalpha acids and hexahydroisoalpha acids, which comprises steam stripping said impurities from the hop flavor at a pH such that steam stripping is effective in removing said impurities to produce the purified hop flavor.

2. The method as recited in claim 1, wherein the hop flavor includes tetrahydroisoalpha acids.

3. The method as recited in claim 2 wherein said steam stripping occurs at a pH such that said tetrahydroisoalpha acids is a salt.

4. The method as recited in claim 2 wherein the steam stripping occurs at a pressure of about 50 millimeters of mercury to atmospheric.

5. The method as recited in claim 2 wherein the steam stripping occurs in the absence of an oxygen containing gas.

6. The method as recited in claim 2 wherein said steam stripping occurs at a pH of about 8-11.

7. The method as recited in claim 1 wherein the hop flavor includes hexahydroisoalpha acids.

8. The method as recited in claim 6 wherein said stripping occurs at a pH such that said hexahydroisoalpha acids is acidic.

9. The method as recited in claim 7 wherein said stripping occurs at a pH less than about 4.

10. The method as recited in claim 7 wherein the steam stripping occurs at a pressure of about 50 millimeters of mercury to atmospheric.

11. The method as recited in claim 7 wherein the steam stripping occurs in the absence of an oxygen containing gas.

* * * * *

UNITED STATES PATENT AND TRADEMARK OFFICE
CERTIFICATE OF CORRECTION

PATENT NO.    : 5,013,572
DATED         : May 7, 1991
INVENTOR(S)   : Bruce A. Hay It is certified that error appears in the above-identified patent and that said Letters Patent is hereby corrected as shown below:

Column 6, line 46, "claim 6" should read -- claim 7 --.

Signed and Sealed this

Twenty-second Day of December, 1992

Attest:

DOUGLAS B. COMER

*Attesting Officer*    *Acting Commissioner of Patents and Trademarks*